(12) United States Patent
Phan et al.

(10) Patent No.: US 10,728,959 B2
(45) Date of Patent: *Jul. 28, 2020

(54) PANE HAVING AN ELECTRIC HEATING LAYER

(71) Applicant: SAINT-GOBAIN GLASS FRANCE, Courbevoie (FR)

(72) Inventors: Dang Cuong Phan, Aachen (DE); Bojan Dimitrijevic, Bochum (DE); Guenther Schall, Kreuzau (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 307 days.

This patent is subject to a terminal disclaimer.

(21) Appl. No.: 15/871,732

(22) Filed: Jan. 15, 2018

(65) Prior Publication Data
US 2018/0139803 A1 May 17, 2018

Related U.S. Application Data

(63) Continuation of application No. 14/653,847, filed as application No. PCT/EP2013/073231 on Nov. 7, 2013, now Pat. No. 9,949,319.

(30) Foreign Application Priority Data

Dec. 20, 2012 (EP) ..................... 12198371

(51) Int. Cl.
*B60L 1/02* (2006.01)
*H05B 3/06* (2006.01)
(Continued)

(52) U.S. Cl.
CPC ......... *H05B 3/84* (2013.01); *B32B 17/10036* (2013.01); *B32B 17/10192* (2013.01);
(Continued)

(58) Field of Classification Search
CPC ........ B32B 17/10036; B32B 17/10192; B32B 17/10761; H05B 2203/005;
(Continued)

(56) References Cited

U.S. PATENT DOCUMENTS 6,559,419 B1    5/2003  Sol et al.
9,949,319 B2    4/2018  Phan et al.
(Continued)

OTHER PUBLICATIONS

Notice of Allowance for U.S. Appl. No. 14/653,843, filed Jun. 18, 2015 on behalf of Saint-Gobain Glass France, dated Aug. 13, 2018. 6 pages.

(Continued)

*Primary Examiner* — Sang Y Paik
(74) *Attorney, Agent, or Firm* — Pillsbury Winthrop Shaw Pittman LLP

(57) ABSTRACT

A pane having an electric heating layer is described, including: a first pane having a surface; at least one electric heating layer that is applied to at least part of the surface and has at least one uncoated zone; at least two busbars, provided for connection to a voltage source, which are connected to the electric heating layer such that a current path for a heating current is formed between the busbars; and n separating lines which electrically subdivide the electric layer into m segments. The segments are arranged in the form of strips around the uncoated zone such that the current path for the heating current is at least partially guided around the uncoated zone and the segments have equal width and the sum of widths of segments is equal to the width of the electric heating layer.

21 Claims, 6 Drawing Sheets

(51) Int. Cl.
H05B 3/84 (2006.01)
H05B 3/26 (2006.01)
B32B 17/10 (2006.01)

(52) U.S. Cl.
CPC ....... *B32B 17/10761* (2013.01); *H05B 3/265* (2013.01); *H05B 3/267* (2013.01); *H05B 2203/005* (2013.01); *H05B 2203/007* (2013.01); *H05B 2203/008* (2013.01); *H05B 2203/013* (2013.01); *H05B 2203/017* (2013.01); *Y10T 29/49085* (2015.01)

(58) Field of Classification Search
CPC ........ H05B 2203/007; H05B 2203/008; H05B 2203/013; H05B 2203/017; H05B 3/265; H05B 3/267; H05B 3/84; Y10T 29/49085
USPC .............................. 219/203, 522, 542–548
See application file for complete search history.

(56) References Cited

U.S. PATENT DOCUMENTS

| | | |
|---|---|---|
| 10,159,115 B2 | 12/2018 | Phan et al. |
| 2004/0065651 A1* | 4/2004 | Voeltzel ............ B32B 17/10036 219/203 |
| 2015/0334779 A1 | 11/2015 | Phan et al. |
| 2015/0351160 A1 | 12/2015 | Phan et al. |

OTHER PUBLICATIONS

Non-Final Office Action for U.S. Appl. No. 14/653,843, filed Jun. 18, 2015 on behalf of Saint-Gobain Glass France, dated Feb. 21, 2018. 7 pages.

* cited by examiner

PANE HAVING AN ELECTRIC HEATING LAYER

CROSS REFERENCE TO RELATED APPLICATIONS

The present application is a U.S. Continuation Application of U.S. Ser. No. 14/653,847 filed on Jun. 18, 2015, which in turn, claims priority to U.S. national stage of International Patent Application PCT/EP2013/073231 filed internationally on Nov. 7, 2013, which in turn, claims priority to European Patent Application No. 12198371.2 filed on Dec. 20, 2012, all of which are incorporated herein by reference in their entirety.

BACKGROUND

The invention relates to a pane having an electric heating layer, a method for its production, and its use.

The field of vision of a motor vehicle window, in particular a windshield, must be kept free of ice and condensation. In the case of motor vehicles with an internal combustion engine, a stream of air heated by engine heat can, for example, be directed to the windows.

Alternatively, the window can have an electrical heating function. Thus, composite glass panes that have an electric heating layer made of a transparent, electrically conductive coating on an interior-side surface of one of the individual panes are known. Using an external voltage source, an electric current that heats the coating and, with it, the pane can be conducted through the electrically conductive coating. WO2012/052315 A1 discloses, for example, such a heatable, electrically conductive coating based on metal.

The electrical contacting of the electric heating layer is typically done via busbars, as is known from US 2007/0020465 A1. The busbars are made, for example, from a printed and fired silver paste. The busbars typically run along the upper and lower edge of the pane. The busbars collect the current that flows through the electric heating layer and conduct it to external feed lines that are connected to a voltage source.

The patterning of the electric heating layer by separating lines or separating zones for the formation of a usually winding current path is known from the industrial series production of panes having an electric heating layer. This has the advantage that the electrical resistance can be increased and the current path can be contacted by relatively small connection electrodes. In the patent literature, such a heatable pane is described, for example, in DE 19860870 A1.

Panes having an electric heating layer shield relatively strongly against electromagnetic radiation such that, in particular in motor vehicles with a heatable windshield, radio data traffic can be significantly impaired. Heatable windshields are, consequently, frequently provided with uncoated or coating-free zones ("communication windows"), which are readily permeable at least for specific ranges of the electromagnetic spectrum. In this manner, trouble-free data traffic is enabled. The uncoated zones, on which electronic devices, such as sensors, cameras, and the like, are situated, are often arranged in the vicinity of the upper edge of the pane where they can be readily concealed by the upper masking strip.

However, uncoated zones negatively affect the electrical properties of the heating layer, which at least locally affects the current density distribution of the heating current flowing through the heating layer. In fact, they cause a highly inhomogeneous heating power distribution, with the heating power significantly reduced below and in the vicinity of the uncoated zones. On the other hand, spots with a particularly high current density develop, in which the heating power is greatly increased. As a consequence, very high local pane temperatures, which constitute a risk of burns, can occur and impose high thermal stresses on the panes. In addition, this can cause loosening of bonding sites of attachments.

SUMMARY OF INVENTION

The object of the present invention consists in providing an improved pane having an uncoated zone and at least approximately uniform heating power distribution, which is simple and economical to produce.

The object of the present invention is accomplished according to the invention by a pane having an electric heating layer in accordance with claim 1. Preferred embodiments emerge from the subclaims.

The pane according to the invention having an electric heating layer comprises at least the following features:
  a first pane with a surface,
  at least one electric heating layer made of an electrically conductive coating to heat the first pane, whereby the electric heating layer is arranged on at least a part of the surface and includes at least one uncoated zone,
  at least two busbars provided for connection to a voltage source, which are connected to the electric heating layer such that a current path for a heating current is formed between the busbars, and
  n separating lines, which electrically subdivide the electric heating layer into m segments, where n is an integer $\geq 1$ and m=n+1,
wherein the segments are arranged in strip form around the uncoated zone such that the current path for the heating current is guided at least partially around the uncoated zone and the width b of the segments is equal and the sum of the widths b of the segments is equal to the width B of the electric heating layer.

This means that the segments are arranged at least partially in strip form around the uncoated zone such that the current path for the heating current is at least partially guided around the uncoated zone and the width b of each segment equals the $m^{th}$ part of the width B of the electric heating layer along a line parallel to the busbars.

The busbars are preferably arranged parallel or approximately parallel to each other since this results in homogeneous current density distribution over the electric heating layer. When the busbars are not arranged parallel to each other, for example, in order to heat a specific region of the electric heating layer more, the line for determination of the width of the electric heating layer is understood to be along an equipotential line of an electric heating layer with no uncoated zone.

The electric heating layer includes at least one uncoated zone. This means that the uncoated zone is completely or partially surrounded by the electric heating layer. The uncoated zone can, in particular, border an edge region of the electric heating layer or be extended via an uncoated strip beyond the edge region of the electric heating layer.

The width b of the segments depends on the width B of the electric heating layer in a respective line parallel to the busbars. The width b of the segments is calculated by dividing the width B of the electric heating layer by the number of segments. When the electric heating layer has one or a plurality of uncoated zones, the width B of the electric heating layer is determined without the width of the uncoated zone.

In an advantageous embodiment of the invention, the width b of the individual segments can deviate as much as 10% from each other, i.e., from the quotient of the width B of the heating layer divided by the number of segments. Preferably, the deviation is ≤5%, particularly preferably ≤2%.

According to the invention, the electric heating layer is subdivided by separating lines into individual segments, each of which guides the current path of the heating current around the uncoated zone. The heating current is, in particular, also guided into the regions above and below the uncoated zone. Here, "above" and "below" mean relative to the direction of the shortest connection lines between the busbars of a pane with no uncoated zone.

The homogeneity of the heating power distribution increases with the number of separating lines and individual segments that guide the heating current. In an advantageous embodiment, the electric heating layer has at least n=3 separating lines and preferably n=7 to 25 separating lines. The separating lines preferably form segments that are arranged at least partially in strip form around the uncoated zone.

Panes according to the invention with a separating line number from 7 to 25 lines have particularly good homogeneity of heating power distribution with, at the same time, economical cost and time expenditures due to the introduction of the separating lines.

In another advantageous embodiment of the pane according to the invention, the width d of the separating line is from 30 μm to 200 μm and preferably from 70 μm to 140 μm.

This has the particular advantage that separating lines with such a small width negatively affect vision through the pane only very little or not at all.

In another advantageous embodiment of the pane according to the invention, the area of the uncoated zone is from 0.5 $dm^2$ to 15 $dm^2$ and preferably from 2 $dm^2$ to 8 $dm^2$.

Panes according to the prior art without separating lines according to the invention and with such large uncoated zones have particularly inhomogeneous heating power distributions and can be only inadequately freed of ice, snow, and condensation under poor weather conditions. Through the use of the separating lines according to the invention, a particularly high improvement of the heating characteristics of the pane can be obtained with such a large uncoated zone.

The busbars are preferably arranged along the side edge on the electrically conductive coating of the electric heating layer. The length of the busbar is typically substantially equal to the length of the side edge of the electrically conductive coating, but can also be slightly larger or smaller. Also, more than two busbars can be arranged on the electrically conductive coating, preferably in the edge region along two opposite side edges of the electrically conductive coating. Even more than two busbars can be arranged on the electric heating layer, for example, to form two or more independent heating fields in an electrically heatable coating or when the busbar is interrupted or displaced by one or more uncoated zones. The teaching according to the invention then applies for at least one and preferably for each of the independent heating fields.

In an advantageous embodiment, the busbar according to the invention is implemented as a printed and fired conductive structure. The printed busbar preferably contains at least one metal, a metal alloy, a metal compound, and/or carbon, particularly preferably a noble metal, in particular, silver.

The printing paste preferably contains metallic particles, metal particles, and/or carbon and, in particular, noble metal particles such as silver particles. Electrical conductivity is preferably obtained by means of the electrically conductive particles. The particles can be situated in an organic and/or an inorganic matrix such as pastes or inks, preferably as printing paste with glass frits.

The width of the first and second busbar is preferably from 2 mm to 30 mm, particularly preferably from 4 mm to 20 mm, and in particular from 10 mm to 20 mm. Thinner busbars result in an excessively high electrical resistance and thus in an excessively high heating of the busbar during operation. Moreover, thinner busbars are difficult to produce using printing techniques such as screen printing. Thicker busbars require an undesirably high use of material. Moreover, they result in an excessively large and unaesthetic reduction in the region of the pane that can be seen through. The length of the busbar is governed by the dimension of the electric heating layer. In the case of a busbar that is typically implemented in the form of a strip, the longer of its dimensions is referred to as length and the less long of its dimensions is referred to as width. The third busbars or additional busbars can be implemented even thinner, preferably from 0.6 mm to 5 mm.

The layer thickness of the printed busbar is preferably from 5 μm to 40 μm, particularly preferably from 8 μm to 20 μm, and most particularly preferably from 8 μm to 12 μm.

Printed busbars with these thicknesses are technically simple to realize and have an advantageous current-carrying capacity.

The specific resistance $\rho_a$ of the busbars is preferably from 0.8 μohm·cm to 7.0 μohm·cm and particularly preferably from 1.0 μohm·cm to 2.5 μohm·cm. Busbars with specific resistances in this range are technically simple to realize and have an advantageous current-carrying capacity.

Alternatively, however, the busbar can also be implemented as a strip of an electrically conductive foil. In that case, the busbar contains, for example, at least aluminum, copper, tinned copper, gold, silver, zinc, tungsten, and/or tin or alloys thereof. The strip preferably has a thickness from 10 μm to 500 μm, particularly preferably from 30 μm to 300 μm. Busbars made of electrically conductive foils with these thicknesses are technically simple to realize and have an advantageous current-carrying capacity. The strip can be electrically conductively connected to the electrically conductive structure, for example, via a soldering compound, via an electrically conductive adhesive, or by direct placement.

The pane according to the invention includes a first pane, on which an electric heating layer is arranged. Depending on the type of the electric heating layer, it is advantageous to protect the heating layer with a protective layer, for example, a lacquer, a polymer film, and/or a second pane.

In an advantageous embodiment of the pane according to the invention, the surface of the first pane, on which the electrically conductive coating is arranged, is areally bonded to a second pane via a thermoplastic intermediate layer.

Basically, all electrically insulating substrates that are thermally and chemically stable as well as dimensionally stable under the conditions of production and use of the pane according to the invention are suitable as the first and, optionally, the second pane.

The first pane and/or the second pane preferably contain glass, particularly preferably flat glass, float glass, quartz glass, borosilicate glass, soda lime glass, or clear plastics, preferably rigid clear plastics, in particular polyethylene, polypropylene, polycarbonate, polymethyl methacrylate, polystyrene, polyamide, polyester, polyvinyl chloride, and/or mixtures thereof. The first pane and/or the second pane are preferably transparent, in particular for the use of the pane as a windshield or rear window of a motor vehicle or other uses in which high light transmittance is desired. In the context of the invention, "transparent" means a pane that has transmittance of more than 70% in the visible spectral range. For panes, that are not situated in the traffic-relevant field of vision of the driver, for example, for roof panes, the transmittance can, however, also be much lower, for example, more than 5%.

The thickness of the pane can vary widely and thus be ideally adapted to the requirements of the individual case. Preferably, panes with the standard thicknesses from 1.0 mm to 2.5 mm, preferably from 1.4 mm to 2.5 mm are used for motor vehicle glass and preferably from 4 mm to 25 mm for furniture, devices, and buildings, in particular for electric heaters. The size of the pane can vary widely and is determined by the size of the use according to the invention. The first pane and, optionally, the second pane have, for example, in the automobile sector and the architectural sector, customary areas from 200 cm$^2$ all the way to 20 m$^2$.

The pane can have any three-dimensional shape. Preferably, the three-dimensional shape has no shadow zones such that it can, for example, be coated by cathode sputtering. Preferably, the substrates are planar or slightly or greatly curved in one or a plurality of spatial directions. In particular, planar substrates are used. The panes can be colorless or tinted.

Multiple panes are bonded to each other by at least one intermediate layer. The intermediate layer preferably contains at least one thermoplastic polymer, preferably polyvinyl butyral (PVB), ethylene vinyl acetate (EVA), and/or polyethylene terephthalate (PET). The thermoplastic intermediate layer can, however, also contain, for example, polyurethane (PU), polypropylene (PP), polyacrylate, polyethylene (PE), polycarbonate (PC), polymethyl methacrylate, polyvinyl chloride, polyacetate resin, casting resins, acrylates, fluorinated ethylene propylenes, polyvinyl fluoride, and/or ethylene tetrafluoroethylene, or copolymers or mixtures thereof. The thermoplastic intermediate layer can be formed by one or even a plurality of thermoplastic films arranged one over another, with the thickness of a thermoplastic film being preferably from 0.25 mm to 1 mm, typically 0.38 mm or 0.76 mm.

In a composite pane according to the invention made of a first pane, an intermediate layer, and a second pane, the electric heating layer can be applied directly on the first pane or on a carrier film or on the intermediate layer itself. The first pane and the second pane have in each case an interior-side surface and an exterior-side surface.

The interior-side surfaces of the first and of the second pane face each other and are bonded to each other via the thermoplastic intermediate layer. The exterior-side surfaces of the first and of the second pane face away from each other and away from the thermoplastic intermediate layer. The electric heating layer is preferably applied on the interior-side surface of the first pane. Of course, another electrically conductive coating can be applied on the interior-side surface of the second pane. The exterior-side surfaces of the panes can also have coatings. The terms "first pane" and "second pane" are selected to distinguish between the two panes in a composite pane according to the invention. No statement concerning the geometric arrangement is associated with the terms. If, for example, the pane according to the invention is provided in an opening, for example, of a motor vehicle or a building, to separate the interior from the external environment, the first pane can face the interior or the external environment.

The electric heating layer includes electrically conductive coating and preferably a transparent, electrically conductive coating. Here, "transparent" means permeable to electromagnetic radiation, preferably electromagnetic radiation of a wavelength from 300 nm to 1.300 nm and in particular to visible light.

Electrically conductive coatings according to the invention are known, for example, from DE 20 2008 017 611 U1, EP 0 847 965 B1, or WO2012/052315 A1. They typically contain one or more, for example, two, three, or four electrically conductive, functional layers. The functional layers preferably contain at least one metal, for example, silver, gold, copper, nickel, and/or chromium or a metal alloy. The functional layers particularly preferably contain at least 90 wt.-% of the metal, in particular at least 99.9 wt.-% of the metal. The functional layers can be made of the metal or the metal alloy. The functional layers particularly preferably contain silver or a silver-containing alloy. Such functional layers have a particularly advantageous electrical conductivity with, at the same time, high transmittance in the visible spectral range. The thickness of a functional layer is preferably from 5 nm to 50 nm, particularly preferably from 8 nm to 25 nm. In this range for the thickness of the functional layer, an advantageously high transmittance in the visible spectral range and a particularly advantageous electrical conductivity are obtained.

Typically, at least one dielectric layer is arranged, in each case, between two adjacent functional layers of the heatable coating. Preferably, another dielectric layer is arranged below the first and/or above the last functional layer. A dielectric layer contains at least one individual layer made of a dielectric material, for example, containing a nitride such as silicon nitride or an oxide such as aluminum oxide. Dielectric layers can, however, also include multiple individual layers, for example, individual layers of a dielectric material, smoothing layers, matching layers, blocker layers, and/or anti-reflection layers. The thickness of a dielectric layer is, for example, from 10 nm to 200 nm.

This layer structure is generally obtained through a sequence of deposition procedures that are performed using a vacuum method such as magnetically enhanced cathodic sputtering.

Other suitable electrically conductive coatings preferably contain indium tin oxide (ITO), fluorine-doped tin oxide ($SnO_2$:F), or aluminum-doped zinc oxide (ZnO:Al).

The electrically conductive coating can, in principle, be any coating that can be electrically contacted. If the pane according to the invention is intended to enable vision through it, as is the case, for example, with panes in the window area, the electrically conductive coating is preferably transparent. In an advantageous embodiment, the electrically conductive coating is a layer or a layer structure of a plurality of individual layers with a total thickness less than or equal to 2 μm, particularly preferably less than or equal to 1 μm.

An advantageous electric heating layer according to the invention has a sheet resistance from 0.4 ohm/square to 10 ohm/square. In a particularly preferred embodiment, the electric heating layer according to the invention has a sheet resistance from 0.5 ohm/square to 1 ohm/square. Coatings with such sheet resistances are particularly well-suited for the heating of motor vehicle window panes at typical onboard voltages from 12 V to 48 volts or in electric motor vehicles with typical onboard voltages of as much as 500 V.

The electric heating layer can extend over the entire surface of the first pane. Alternatively, the electric heating layer can also extend over only part of the surface of the first pane. The electric heating layer preferably extends over at least 50%, particularly preferably over at least 70%, and most particularly preferably over at least 90% of the interior-side surface of the first pane. The electric heating layer can have one or a plurality of uncoated zones. These zones can be permeable for electromagnetic radiation and are known, for example, as data transmission windows or communication windows.

In an advantageous embodiment of the pane according to the invention as a composite pane, the interior-side surface of the first pane has a circumferential edge region with a width from 2 mm to 50 mm, preferably from 5 mm to 20 mm, that is not provided with the electrically conductive coating of the electric heating layer. Then, the electrically conductive coating has no contact with the atmosphere and is, in the interior of the pane, advantageously protected by the thermoplastic intermediate layer against damage and corrosion.

The electrical feed line is preferably implemented as a flexible foil conductor (flat conductor, ribbon cable). This means an electrical conductor whose width is significantly greater than its thickness. Such a foil conductor is, for example, a strip or band containing or made of copper, tinned copper, aluminum, silver, gold, or alloys thereof. The foil conductor has, for example, a width from 2 mm to 16 mm and a thickness from 0.03 mm to 0.1 mm. The foil conductor can have an insulating, preferably polymeric sheath, for example, polyimide-based. Foil conductors that are suitable for the contacting of electrically conductive coatings in panes have only a total thickness of, for example, 0.3 mm. Such thin foil conductors can be embedded without difficulty in the thermoplastic intermediate layer between the individual panes. A plurality of conductive layers electrically isolated from each other can be situated in a foil conductor band.

Alternatively, thin metal wires can also be used as an electrical feed line. The metal wires contain, in particular, copper, tungsten, gold, silver, or aluminum or alloys of at least two of these metals. The alloys can also contain molybdenum, rhenium, osmium, iridium, palladium, or platinum.

In an advantageous embodiment of the invention, the electrical feed line is connected to a contact strip, for example, by means of a soldering compound or an electrically conductive adhesive. The contact strip is then connected to the busbar. The contact strip advantageously increases the current-carrying capacity of the busbar. Also, undesirable heating of the contact point between the busbar and the feed line can be prevented by the contact strip. In addition, the contact strip simplifies the electrical contacting of the busbar by the electrical feed line since the feed line does not have to be connected, for example, soldered, to the already applied busbar.

The contact strip preferably contains at least one metal, particularly preferably copper, tinned copper, silver, gold, aluminum, zinc, tungsten, and/or tin. This is particularly advantageous with regard to the electrical conductivity of the contact strip. The contact strip can also include alloys which preferably contain one or a plurality of the elements mentioned and, optionally, other elements, for example, brass or bronze.

The contact strip is preferably implemented as a strip of a thin, electrically conductive foil. The thickness of the contact strip is preferably from 10 μm to 500 μm, particularly preferably from 15 μm to 200 μm, most particularly preferably from 50 μm to 100 μm. Foils with these thicknesses are technically simple to produce and readily available and also have an advantageously low electrical resistance.

The length of the contact strip is preferably from 10 mm to 400 mm, particularly preferably from 10 mm to 100 mm and, in particular, 20 mm to 60 mm. This is particularly advantageous with regard to good handleability of the contact strip as well as an adequately large contact area for the electrical contacting between the busbar and the contact strip.

The width of the contact strip is preferably from 2 mm to 40 mm, particularly preferably from 5 mm to 30 mm. This is particularly advantageous with regard to the contact area between the contact strip and the busbar and simple connection of the contact strip to the electrical feed line. The terms "length" and "width" of the contact strip refer in each case to the dimension in the same direction indicated by "length" or "width" of the busbar.

In a preferred embodiment, the contact strip is in direct contact with the busbar over its entire surface. For this, a contact strip is placed on the busbar. The particular advantage resides in simple production of the pane and the use of the entire surface of the contact strip as the contact surface.

The contact strip can simply be placed on the busbar and is durably stably fixed in the intended position inside the laminated pane.

The invention further comprises a method for producing a pane with electrical contacting, comprising at least:

(a) application of an electric heating layer with an uncoated zone on a surface (III) of a first pane, (b) application of at least two busbars substantially parallel to each other provided for connection to a voltage source, which are connected to the electric heating layer such that a current path for a heating current is formed between the busbars, and (c) introduction of n separating lines, which electrically subdivide the electric heating layer into m segments, where n is an integer $\geq 1$ and m=n+1, wherein the segments are arranged at least partially in strip form around the uncoated zone such that the current path for the heating current is guided at least partially around the uncoated zone and the width b of all segments is equal and the sum of the widths b of the segments is equal to the width B of the electric heating layer.

When the busbars run parallel or approximately parallel to each other, the width B is advantageously determined along a line parallel to the busbars. When the electric heating layer has an uncoated zone, the width B is the sum of the widths of the electric heating layer that surround the uncoated zone, in other words, in the determination of the width B, the width of the uncoated zone along the parallel line is not taken into account.

The application of the electric heating layer in process step (a) can be done by methods known per se, preferably by magnetically enhanced cathodic sputtering. This is particularly advantageous with regard to simple, fast, economical, and uniform coating of the first pane. However, the electric heating layer can also be applied, for example, by vapor deposition, chemical vapor deposition (CVD), plasma enhanced chemical vapor deposition (PECVD), or by wet chemical methods.

The first pane can be subjected to a temperature treatment after process step (a). The first pane with the electrically conductive coating is heated to a temperature of at least 200° C., preferably at least 300° C. The temperature treatment can serve to increase the transmittance and/or to reduce the sheet resistance of the electric heating layer.

The first pane can be bent after process step (a), typically at a temperature from 500° C. to 700° C. Since it is technically simpler to coat a flat pane, this procedure is advantageous if the first pane is to be bent. However, alternatively, the first pane can also be bent before process step (a), for example, if the electric heating layer is unsuited to withstand a bending process without damage.

The application of the busbar in process step (b) is preferably done by printing and firing an electrically conductive paste in a screen printing process or in an inkjet process. Alternatively, the busbar can be applied, preferably placed, soldered, or glued, on the electrically conductive coating as a strip of an electrically conductive foil.

In screen printing methods, the lateral shaping is done by masking the mesh through which the printing paste with the metal particles is pressed. By means of appropriate shaping of the masking, the width b of the busbar, for example, can be predefined and varied in a particularly simple manner.

The decoating of individual separating lines in the electrically conductive coating is done preferably using a laser beam. Methods for patterning thin metal foils are known, for example, from EP 2 200 097 A1 or EP 2 139 049 A1. The width of the decoating is preferably 10 µm to 1000 µm, particularly preferably 30 µm to 200 µm, and in particular 70 µm to 140 µm. In this range, a particularly clean and residue-free decoating takes place using the laser beam. The decoating using a laser beam is particularly advantageous since the decorated lines are optically very inconspicuous and the appearance and the vision through the pane are negatively affected only slightly. The decoating of a line with a width that is wider than the width of a laser cut is done by repeated runs along the line with a laser beam. Consequently, the duration and costs of the process increase with increasing line width. Alternatively, the decoating can be done by mechanical ablation as well as by chemical or physical etching.

An advantageous improvement of the method according to the invention includes at least the following additional steps:

(d) arranging a thermoplastic intermediate layer on the coated surface of the first pane and arranging a second pane on the thermoplastic intermediate layer, and (e) bonding the first pane and the second pane via the thermoplastic intermediate layer.

In process step (d), the first pane is arranged such that the one of its surfaces which is provided with the electrically conductive coating faces the thermoplastic intermediate layer. The surface thus becomes the interior-side surface of the first pane.

The thermoplastic intermediate layer can be formed by one single thermoplastic film or by two or more thermoplastic films that are arranged areally one over another.

The bonding of the first and second pane in process step (e) is preferably done under the action of heat, vacuum, and/or pressure. Methods known per se can be used for producing a pane.

For example, so-called autoclave methods can be performed at an elevated pressure of roughly 10 bar to 15 bar and temperatures from 130° C. to 145° C. over roughly 2 hours. Vacuum bag or vacuum ring methods known per se operate, for example, at roughly 200 mbar and 80° C. to 110° C. The first pane, the thermoplastic intermediate layer, and the second pane can also be pressed in a calender between at least one pair of rollers to form a pane. Systems of this type are known for producing panes and normally have at least one heating tunnel upstream before a pressing facility. The temperature during the pressing procedure is, for example, from 40° C. to 150° C.

Combinations of calendering and autoclaving methods have proven especially effective in practice. Alternatively, vacuum laminators can be used. These consist of one or a plurality of heatable and evacuable chambers in which the first pane and the second pane are laminated within, for example, roughly 60 minutes at reduced pressures from 0.01 mbar to 800 mbar and temperatures from 80° C. to 170° C.

The invention further includes the use of the pane according to the invention with electrical contacting in buildings, in particular in the access area, window area, roof area, or façade area, as a built-in component in furniture and devices, in means of transportation for travel on land, in the air, or on water, in particular in trains, boats, and motor vehicles, for example, as a windshield, rear window, side window, and/or roof pane.

BRIEF DESCRIPTION OF THE DRAWINGS

The invention is explained in detail in the following with reference to drawings and exemplary embodiments. The drawings are a schematic representation and not true to scale. The drawings in no way restrict the invention.

They depict.

DETAILED DESCRIPTION OF THE INVENTION

Figure 1:
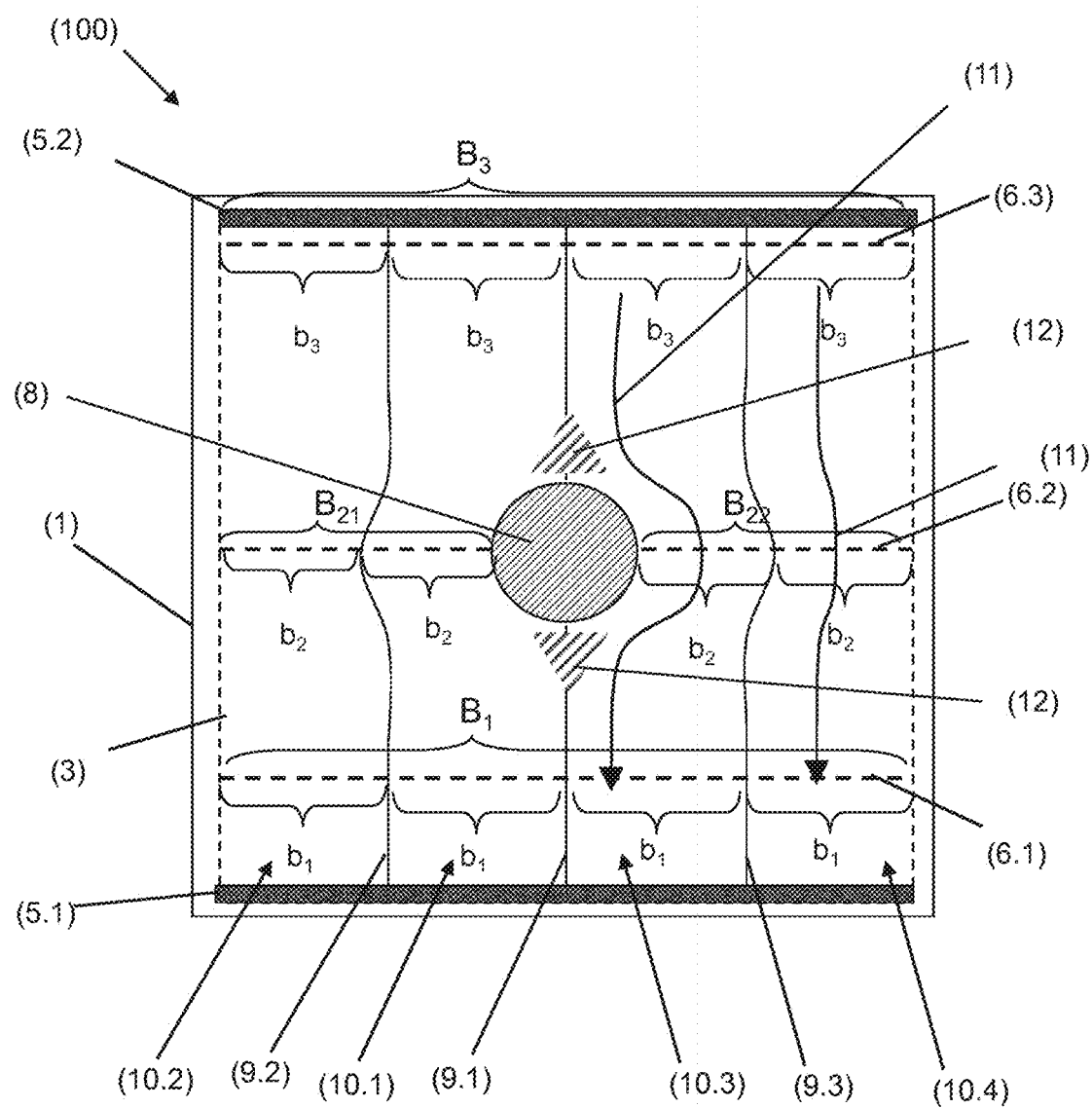
FIG. 1 a plan view of an embodiment of the pane according to the invention having an electric heating layer, FIG. 2 a plan view of a pane according to the prior art, FIG. 3 a plan view of another embodiment of the pane according to the invention, FIG. 4 a plan view of another embodiment of the pane according to the invention, FIG. 5 a plan view of another embodiment of the pane according to the invention, and FIG. 6 a detailed flowchart of an embodiment of the method according to the invention.

FIG. 1 depicts a plan view of an exemplary embodiment of a pane 100 according to the invention having an electric heating layer 3. The pane 100 comprises a first pane 1 and is made, for example, of soda lime glass. An electric heating layer 3 made of an electrically conductive coating is applied on a surface III of the first pane 1. The electric heating layer 3 is a layer system that contains, for example, three electrically conductive silver layers that are separated from each other by dielectric layers. When a current flows through the electric heating layer 3, it is heated due to its electrical resistance and Joule heat development. The electric heating layer 3 can, consequently, be used for active heating of the pane 100. The dimensions of the pane 100 are, for example, 1 m×1 m.

The electric heating layer 3 extends, for example, over the entire surface III of the first pane 1 minus a circumferential frame-shaped uncoated region with a width of 1 cm, in each case.

For the electrical contacting of the electric heating layer 3, a first busbar 5.1 is arranged in the lower edge region and another, second busbar 5.2 is arranged in the upper edge region, respectively, on the electric heating layer 3. The busbars 5.1, 5.2 contain, for example, silver particles and were applied by screen printing and then fired. The length of the busbars 5.1, 5.2 corresponds to approximately the dimension of the electric heating layer 3. The two busbars 5.1, 5.2 run approximately parallel.

When an electric voltage is applied to the busbars 5.1 and 5.2, a uniform current flows along current paths 11 through the electric heating layer 3 between the busbars 5.1, 5.2. On each busbar 5.1, 5.2, a feed line 7 that is electrically conductively connected to the busbar 5.1, 5.2 is arranged approximately centrally. The busbars 5.1, 5.2 are connected to a voltage source via the electrical feed lines 7.

An uncoated zone 8 is arranged in the center of the pane 100. The uncoated zone 8 has no electrically conductive material of the electric heating layer 3. Here, the uncoated zone 8 is, for example, completely surrounded by the electric heating layer 3. The uncoated zone 8 is, for example, implemented in the shape of a circle and has a diameter of 10 cm.

Here, the electric heating layer 3 has n=3 separating lines 9.1, 9.2, 9.3. In the region of the separating lines 9.1, 9.2, 9.3, the electric heating layer 3 is electrically interrupted. The separating lines 9.1, 9.2, 9.3 are arranged in strip form around the uncoated zone 8 and form four segments 10.1, 10.2, 10.3, 10.4 in the electric heating layer 3. The current paths 11 are guided around the uncoated zone 8 by the segments 10.1, 10.2, 10.3, 10.4 in the electric heating layer 3. In particular, the current paths 11 in the segments 10.1, 10.3 are guided in the immediate vicinity of the uncoated zone 8 into the region 12 above and below the uncoated zone 8. In this region, only a small heating power would be obtained in an electric heating layer 3 according to the prior art without separating lines (cf. FIG. 2).

The separating lines 9.1, 9.2, 9.3 have a width of, for example, only 100 µm and are, for example, introduced into the electric heating layer 3 by laser patterning. Separating lines 9.1, 9.2, 9.3 with such a small width are hardly perceptible optically and only disrupt vision through the pane 100 a little, which is of special importance for driving safety in particular for use in motor vehicles.

The width b of the segments 10.1, 10.2, 10.3, 10.4 depends on the width B of the electric heating layer 3 in a respective line 6 parallel to the busbars 5.1, 5.2. and is calculated by division of the width B by the number of segments. In FIG. 1, three parallel lines 6.1, 6.2, 6.3 are sketched in by way of example. The electric heating layer 3 has, along the line 6.1, for example, a width B of 98 cm. The width $b_1$ of the segments 10.1, 10.2, 10.3, 10.4 is then ¼ $B_1$=24.5 cm. Since the separating lines have a very small width of, for example, 100 µm, this can be ignored in the evaluation of the width $b_1$. Since the pane 100 is configured as a rectangle in this example, the width $B_3$ along the line 6.3 is also 98 cm and the width $b_3$ is also 24.5 cm.

The width $B_2$ of the electric heating layer 3 along a line 6.2 in the region of the uncoated zone 8 is calculated by the addition $B_{21}+B_{22}$, in other words, the stretch along the line 6.2 in the uncoated zone 8 is not part of the width $B_2$. Here, the width $B_2$ is, for example, 88 cm, such that the width $b_2$ of the segments 10.1, 10.2, 10.3, 10.4 is 22 cm.

Figure 2:
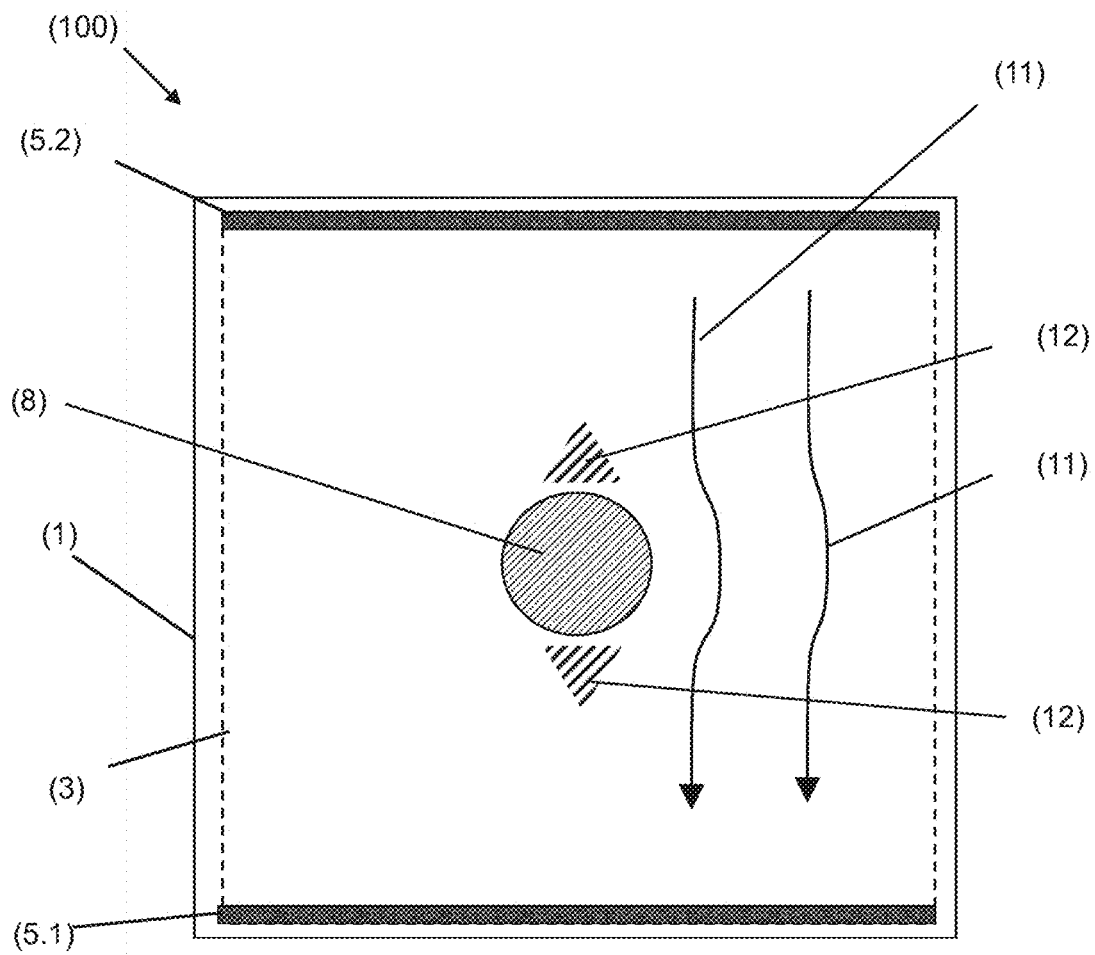

FIG. 2 depicts a pane 100 according to the prior art. The first pane 1, the busbars 5.1, 5.2, the electric heating layer 3, as well as the uncoated zone 8 correspond to the pane 100 of FIG. 1. The pane 100 according to the prior art has no separating lines and, as a result, no segments that guide the current path 11 around the uncoated zone 8. The heating power distribution of the pane 100 according to the prior art is very inhomogeneous. Only a small current flows through the regions 12 above and below the uncoated zone 8, and the pane 100 according to the prior art is only heated insignificantly in the regions 12.

Figure 3:
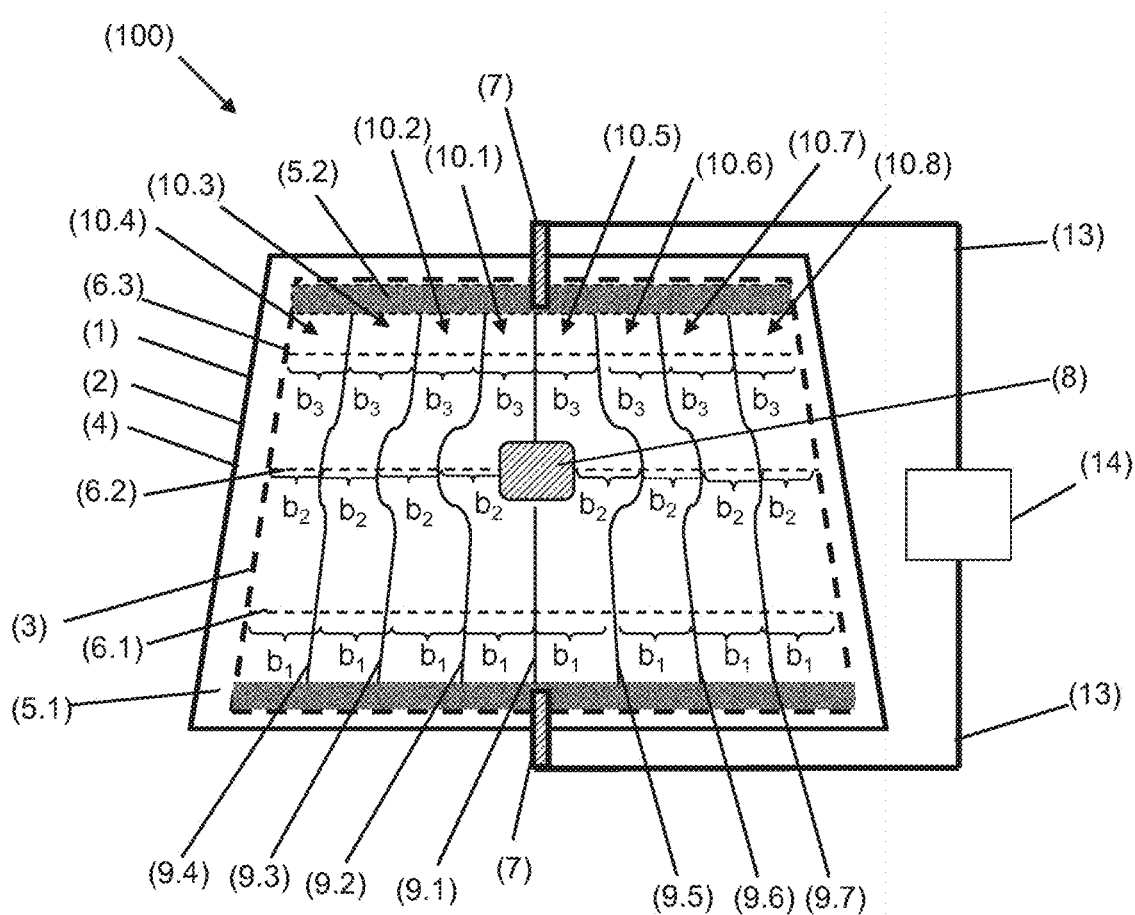

FIG. 3 depicts a plan view of another exemplary embodiment of a pane 100 according to the invention having an electric heating layer. The pane 100 comprises a first pane 1 and a second pane 2, which are bonded to each other via a thermoplastic intermediate layer 4. The pane 100 is, for example, a motor vehicle window and, in particular, the windshield of an automobile. The first pane 1 is, for example, intended to face the interior in the installed position. The first pane 1 and the second pane 2 are made of soda lime glass. The thickness of the first pane 1 is, for example, 1.6 mm and the thickness of the second pane 2 is 2.1 mm. The thermoplastic intermediate layer 4 is made of polyvinyl butyral (PVB) and has a thickness of 0.76 mm. An electric heating layer 3 made of an electrically conductive coating is applied on the interior-side surface III of the first pane 1. The electric heating layer 3 is a layer system that contains, for example, three electrically conductive silver layers that are separated from each other by dielectric layers. When a current flows through the electric heating layer 3, it is heated due to its electrical resistance and Joule heat development. The electric heating layer 3 can, consequently, be used for active heating of the pane 100.

The electric heating layer 3 extends, for example, over the entire surface Ill of the first pane 1 minus a circumferential frame-shaped uncoated region with a width of 8 mm. The uncoated region is used for the electrical insulation between the current-carrying electric heating layer 3 and the motor vehicle body. The uncoated region is hermetically sealed by gluing to the intermediate layer 4 to protect the electric heating layer 3 against damage and corrosion.

For the electrical contacting of the electric heating layer 3, in each case, a first busbar 5.1 is arranged in the lower edge region and another, second busbar 5.2 is arranged in the upper edge region on the electric heating layer 3. The busbars 5.1, 5.2 contain, for example, silver particles and were applied by screen printing and then fired. The length of the busbars 5.1, 5.2 corresponds to approximately the dimension of the electric heating layer 3.

When an electric voltage is applied to the busbars 5.1 and 5.2, a uniform current flows through the electric heating layer 3 between the busbars 5.1, 5.2. A feed line 7 is arranged approximately centrally on each busbar 5.1, 5.2. The feed line 7 is a foil conductor known per se. The feed line 7 is electrically conductively connected to the busbar 5.1, 5.2 via a contact surface, for example, by means of a soldering compound, an electrically conductive adhesive, or by simple placement and application of pressure inside the pane 100. The foil conductor contains, for example, a tinned copper foil with a width of 10 mm and a thickness of 0.3 mm. The busbars 5.1, 5.2 are connected via the electrical feed lines 7 via connecting cable 13 to a voltage source 14, which provides a customary onboard voltage for motor vehicles, preferably from 12 V to 15 V and, for example, roughly 14 V. Alternatively, the voltage source 14 can even have higher voltages, for example, from 35 V to 45 V, and in particular 42 V.

An uncoated zone 8 is arranged in the pane 100 roughly centrally relative to the width of the pane. The uncoated zone 8 has no electrically conductive material of the electric heating layer 3. Here, the uncoated zone 8 is, for example, completely surrounded by the electric heating layer 3. Alternatively, the uncoated zone 8 can be arranged at the edge of the electric heating layer 3. The area of the uncoated zone 8 is, for example, 1.5 dm². The length of the uncoated zone 8 is, for example, 10 cm. Here, the term "length" means the dimension in the direction that runs in the direction of the current path through the pane, i.e., in the direction of the shortest connecting line between the busbars 5.1, 5.2. In the example of the motor vehicle window of FIG. 1, the length of the uncoated zone 8 is arranged in the vertical direction and the width in the horizontal direction, parallel to the busbars 5.1, 5.2. The uncoated zone 8 is adjacent the busbar 5.3 on its upper end.

The busbars 5.1, 5.2, 5.3 have, in the example depicted, a constant thickness of, for example, roughly 10 μm and a constant specific resistance of, for example, 2.3 μohm·cm.

Here, the electric heating layer 3 has n=7 separating lines 9.1-9.7. In the region of the separating lines 9.1-9.7, the electric heating layer 3 is electrically interrupted. The separating lines 9.1-9.7 are arranged in strip form around the uncoated zone 8 and form 8 segments 10.1-10.8 in the electric heating layer 3. After application of a voltage on the busbars 5.1, 5.2, the electrical current is guided around the uncoated zone 8 through the segments 10.1-10.8 in the electric heating layer 3.

The separating lines 9.1-9.7 have a width of, for example, only 100 μm and are, for example, introduced into the electric heating layer 3 by laser patterning. Separating lines 9.1-9.7 with such a small width are hardly perceptible optically and only disrupt vision through the pane 100 a little, which is of special importance for driving safety in particular for use in motor vehicles.

The width b of the segments 10.1-10.8 depends on the width B of the electric heating layer 3 in a respective line 6 parallel to the busbars 5.1, 5.2. The width b of the segments 10.1-10.8 is calculated by division of the width B by the number of segments. In FIG. 2, three parallel lines 6.1, 6.2, 6.3 are sketched in by way of example. The electric heating layer 3 has, along the line 6.1, for example, a width $B_1$. The width $b_1$ of the segments 10.1-10.8 is then ⅛ $B_1$. Since the electric heating layer 3 is configured as a trapezoid in this example, the width $b_3$ of the segments 10.1-10.8 along the line 6.3 is ⅛ $B_3$. The width $B_2$ along the line 6.2 is, as stated in FIG. 1, understood to be without the width of the uncoated zone 8.

Figure 4:
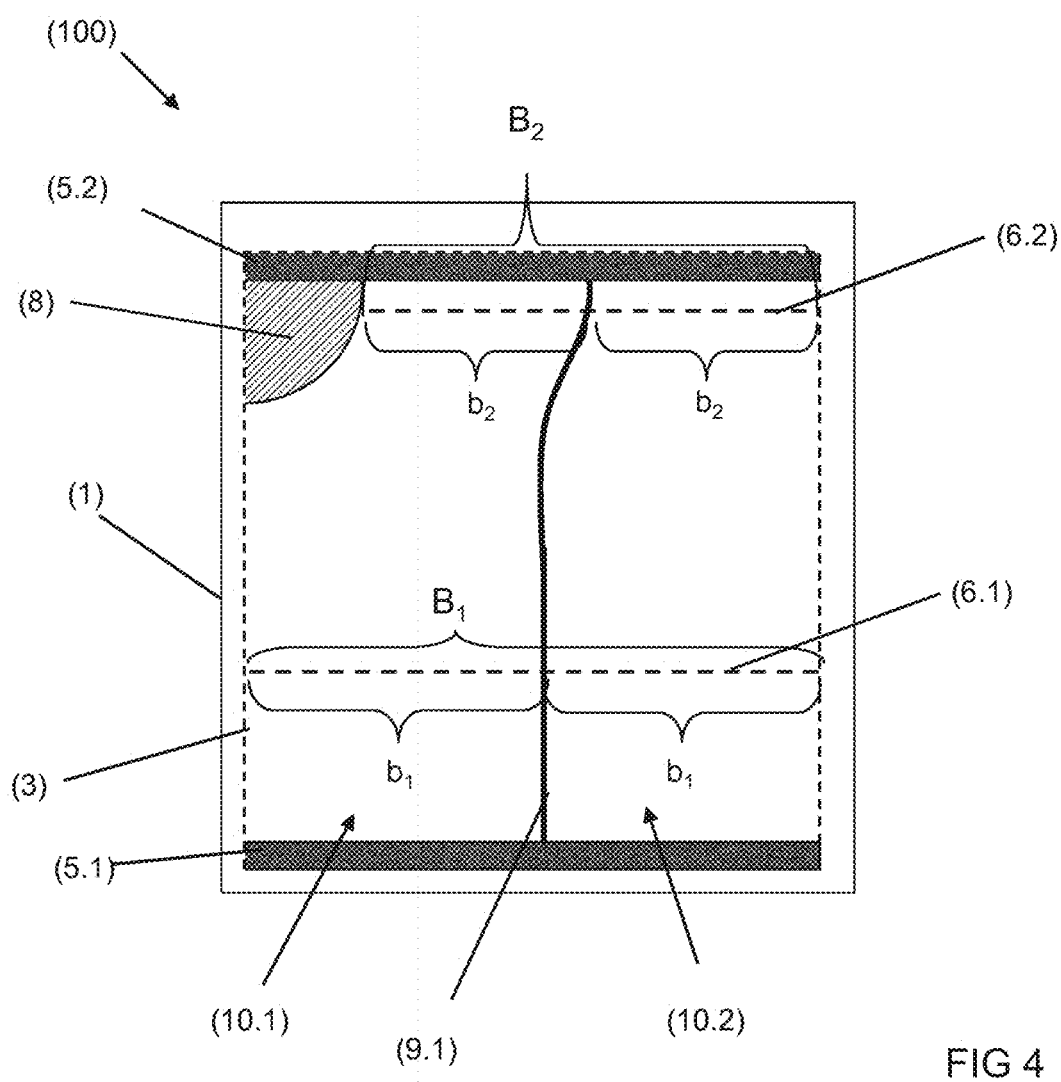

FIG. 4 depicts a plan view of another embodiment of a pane 100 according to the invention. The first pane 1, the busbars 5.1, 5.2, and the electric heating layer 3 correspond to the pane 100 of FIG. 1. An uncoated zone 8 is arranged, by way of example, in the upper left corner of the pane 100.

Here, the electric heating layer 3 has n=1 separating line 9.1. In the region of the separating line 9.1, which subdivides the electric heating layer into two segments 10.1, 10.2. The electric heating layer 3 has, along the line 6.1, for example, a width $B_1$ of 98 cm. The width $b_1$ of the segments 10.1, 10.2 is then ½ $B_1$=49 cm.

The width $B_2$ of the electric heating layer 3 along a line 6.2 in the region of the uncoated zone 8 is, for example, 93 cm, such that the width $b_2$ of the segments 10.1, 10.2 is 46.5 cm.

Figure 5:
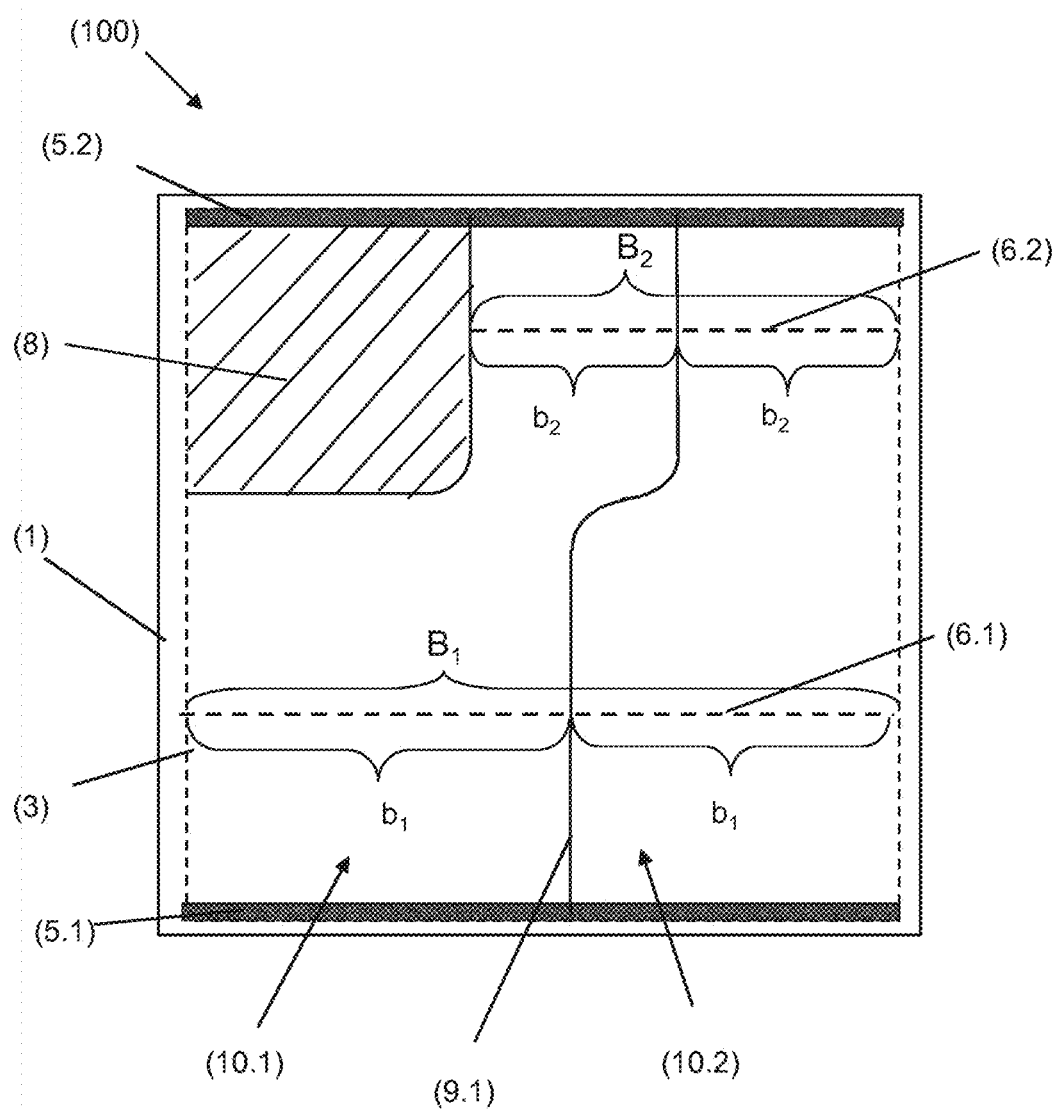

FIG. 5 depicts a plan view of another embodiment of a pane 100 according to the invention. The first pane 1, the busbars 5.1, 5.2, and the electric heating layer 3 correspond to the pane 100 of FIG. 1. An uncoated zone 8 is arranged, by way of example, in the upper left corner of the pane 100. The uncoated zone 8 has, for example, a rectangular shape with one rounded corner. Rounded corners in the electric heating layer 3 are particularly advantageous since, by this means, local heat concentrations, so-called hotspots, are avoided.

Here, the electric heating layer 3 has n=1 separating line 9.1. In the region of the separating line 9.1, which subdivides the electric heating layer into two segments 10.1, 10.2. The electric heating layer 3 has, along the line 6.1, for example, a width $B_1$ of 98 cm. The width $b_1$ of the segments 10.1, 10.2 is then ½ $B_1$ =49 cm.

The width $B_2$ of the electric heating layer 3 along a line 6.2 in the region of the uncoated zone 8 is, for example, 93 cm, such that the width $b_2$ of the segments 10.1, 10.2 is 46.5 cm.

Figure 6:
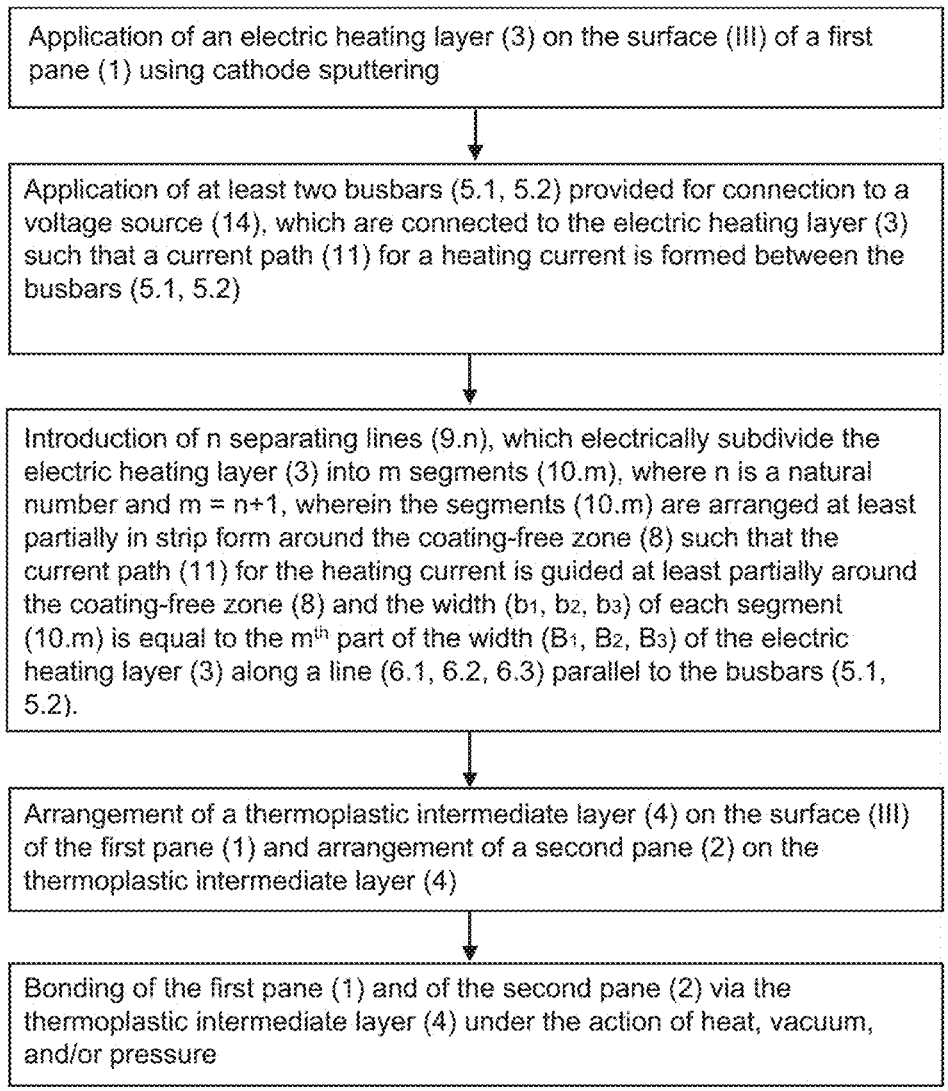

FIG. 6 depicts a flowchart of an exemplary embodiment of the method according to the invention for producing a pane 100 having an electric heating layer 3 using the example of a composite glass pane.

The pane 100 according to the invention in accordance with FIGS. 1 and 3-5 has improved heating properties, such as more homogeneous heating power distribution and more homogeneous temperature distribution, in particular in the critical region 12 below the uncoated zone 8. The view through the pane is only minimally impaired due to the low width of the laser-patterned separating lines 9 and satisfies the requirements for a motor vehicle glazing.

This result was unexpected and surprising for the person skilled in the art.

LIST OF REFERENCE CHARACTERS (1) first pane
(2) second pane
(3) electric heating layer, electrically conductive coating,
(4) thermoplastic intermediate layer
(5.1), (5.2) busbar
(6.1), (6.2), (6.3) line
(7) feed line
(8) uncoated region, communication window
(9.1), (9.2), (9.3), (9.4), (9.5), (9.6), (9.7) separating line, separating zone
(10.1), (10.2), (10.3), (10.4), (10.5), (10.6), (10.7), (10.8) segment
(11) current path
(12) region
(13) connecting cable
(14) voltage source
(100) pane, electrically heatable pane
(III) surface of the first pane 1
b, $b_1$, $b_2$, $b_3$ width of the segments 10.1-10.8
B, $B_1$, $B_2$, $B_3$ width of the electric heating layer 3
d width of the separation line 9.1-9.7

What is claimed is:

1. A pane having an electric heating layer, comprising:
   a pane with a surface;
   at least one electric heating layer that is applied at least on part of the surface and includes at least one uncoated zone in a corner of the surface;
   at least two busbars provided for connection to a voltage source, at least two busbars being connected to the electric heating layer such that a current path for a heating current is formed between the at least two busbars; and at least one separating line that electrically subdivides the electric heating layer into at least two segments, wherein there is only one more of the at least two segments than the at least one separating line;
   wherein the at least two segments are arranged in strip form such that the current path for the heating current is guided curving away from the at least one uncoated zone,
   wherein, for each busbar of the at least two busbars, the at least two segments have equal widths at that busbar.

2. The pane according to claim 1, wherein the at least one electric heating layer has three separating lines.

3. The pane according to claim 1, wherein the at least one electric heating layer has at least seven separating lines and no more than twenty-five separating lines.

4. The pane according to claim 1, wherein a width of each separating line is from 30 μm to 200 μm at a given busbar.

5. The pane according to claim 1, wherein a width of each separating line is from 70 μm to 140 μm at a given busbar.

6. The pane according to claim 1, wherein an area of the uncoated zone is from 0.5 dm² to 15 dm².

7. The pane according to claim 1, wherein an area of the uncoated zone is from 2 dm² to 8 dm².

8. The pane according to claim 1, wherein at least one of the at least two busbars is implemented as fired printing paste.

9. The pane according to claim 8, wherein the fired printing paste contains at least one of metallic particles, metal particles, and carbon particles.

10. The pane according to claim 8, wherein the fired printing paste has a specific resistance from 0.8 μohm·cm to 7.0 μohm·cm.

11. The pane according to claim 8, wherein the fired printing paste has a maximum width from 4 mm to 30 mm.

12. The pane according to claim 1, wherein the at least two busbars are arranged on one or more of a region of the electric heating layer and the surface of the pane that is areally bonded to a second pane via a thermoplastic intermediate layer.

13. The pane according to claim 1, wherein the pane contains glass.

14. The pane according to claim 1, wherein the pane contains flat glass, float glass, quartz glass, borosilicate glass, or soda lime glass.

15. The pane according to claim 1, wherein the pane contains a polymer.

16. The pane according to claim 1, wherein the pane contains one or more of polyethylene, polypropylene, polycarbonate, and polymethyl methacrylate.

17. The pane according to claim 1, wherein the electric heating layer is a transparent, electrically conductive coating.

18. The pane according to claim 17, wherein the electric heating layer has a sheet resistance from 0.4 ohm/square to 10 ohm/square.

19. The pane according to claim 18, wherein the electric heating layer contains silver, indium tin oxide, fluorine-doped tin oxide, or aluminum-doped zinc oxide.

20. A method for producing a pane having an electric heating layer, comprising:
   applying an electric heating layer having an uncoated zone onto a surface of a pane, such that the uncoated zone is in a corner of the surface;
   connecting at least two busbars to the electric heating layer, the at least two busbars being configured for connection to a voltage source and being parallel to each other such that a current path for a heating current is formed between the busbars; and
   introducing at least one separating line that electrically subdivides the electric heating layer into at least two segments,
   wherein there is only one more of the at least two segments than the at least one separating line,
   wherein each of the segments are arranged at least partially in strip form past the uncoated zone such that the current path for the heating current is guided curving away from the uncoated zone, and
   wherein, for each busbar of the at least two busbars, the at least two segments have equal widths at that busbar.

21. The method according to claim 20, wherein introducing at least one separating line includes laser patterning.

* * * * *